US007284563B2

(12) United States Patent
Partridge et al.

(10) Patent No.: US 7,284,563 B2
(45) Date of Patent: Oct. 23, 2007

(54) SURGE RELIEF APPARATUS AND METHOD

(75) Inventors: Charles C. Partridge, Houston, TX (US); Donald J. Wass, Bellville, TX (US); Donald M. Allen, Benicia, CA (US)

(73) Assignee: SPX Corporation, Charlotte, NC (US)

( * ) Notice: Subject to any disclaimer, the term of this patent is extended or adjusted under 35 U.S.C. 154(b) by 159 days.

(21) Appl. No.: 10/845,243

(22) Filed: May 14, 2004

(65) Prior Publication Data

US 2005/0252554 A1 Nov. 17, 2005

(51) Int. Cl.
*F16L 55/04* (2006.01)

(52) U.S. Cl. ......................... 137/14; 137/488; 137/485

(58) Field of Classification Search .................. 137/14, 137/115.13, 488, 207, 565.17, 565.34
See application file for complete search history.

(56) References Cited

U.S. PATENT DOCUMENTS 3,714,953 A * 2/1973 Solvang ....................... 137/14
3,890,992 A * 6/1975 Wolz et al. ................... 137/14
3,911,941 A * 10/1975 Gerbic et al. .......... 137/115.22
3,972,364 A * 8/1976 Brumm ...................... 137/485
4,182,358 A * 1/1980 Sinelnikov et al. .... 137/115.13
4,261,387 A * 4/1981 Cohn ......................... 137/485
4,282,757 A * 8/1981 Cohn .......................... 73/714
4,340,079 A * 7/1982 Smith et al. ................ 137/207
5,396,923 A * 3/1995 Allen et al. .............. 137/487.5
6,199,378 B1 * 3/2001 Aardema et al. ............. 60/468
6,648,010 B1 * 11/2003 Goodwin ................. 137/493.1
7,044,156 B2 * 5/2006 Webster ...................... 137/488
2005/0161096 A1 * 7/2005 Sauer et al. ........... 137/599.14

FOREIGN PATENT DOCUMENTS

EP 0107459 A 5/1984
GB 1462747 A 1/1977

* cited by examiner

*Primary Examiner*—Ramesh Krishnamurthy
(74) *Attorney, Agent, or Firm*—Baker & Hostetler LLP

(57) ABSTRACT

A surge relief apparatus for sensing, tracking and responding to pressure changes in a flow system. The apparatus includes a fluid storage tank that is in fluid communication with the flow system. The apparatus also includes a control valve that is connected to the fluid storage tank, wherein the control valve compensates for pressure in response to pressure change in the flow system. The control valve also controls the rate of pipeline pressure rise in the flow system. The surge relief apparatus also includes a hydraulic accumulator in fluid communication with the control valve along with a surge relief valve in fluid communication with the accumulator.

15 Claims, 9 Drawing Sheets

SURGE RELIEF APPARATUS AND METHOD

FIELD OF THE INVENTION

The present invention relates generally to a surge relief apparatus and method. Specifically, the present invention relates to a surge relief apparatus and method for sensing and controlling surges and/or transients to protect piping systems from damage due to transients by controlling the rate of pressure change in a fluid system.

BACKGROUND OF THE INVENTION

In most fluid systems, there is a need to guard against damage associated with pressure surges. Typically, a pressure surge is generated when there is a change in the rate of flow of fluid in a closed conduit. The surge pressure can be dangerously high if the change in the rate of fluid flow in the conduit is too great. In many applications, such as pipelines and storage or loading and unloading terminals, there is a need to protect equipment and personnel from the potential damages that such pressure surges create.

Pressure surges are sometimes called "water hammer." The surge of pressure can be generated by any pipeline component that causes the fluid velocity in the conduit to change. For example, surge pressures or water hammer can be created by closing an automatic emergency shut down (ESD) device, the closure or opening of a manual or power operated valve, slamming shut of a non-return valve, or starting or stopping a pump. To protect larger fluid systems from piping component failure, the pressure surge associated with the water hammer must be relieved. In piping systems, it is especially important that a surge relief system be adaptable for a quick response time, and adaptable with respect to high flow capacity.

Surge pressures may vary in magnitude from virtually undetectable to such severity as to cause significant problems. Several examples of problems caused by insufficient surge protection in fluid systems include separation of flanges, pipe fatigue, weld failure or circumferential or longitudinal over stressing of the pipe, pumps knocked out of alignment, severe damage to piping and piping supports as well as damage to specialized components such as loading arms, hoses, filters and the like due to the hydraulic shock propagated through the fluid. It is important that during interruption of steady-state operation a potentially damaging transient, i.e., a water hammer, is detected, and automatically expunged by relieving a sufficient volume of fluid from the system, thereby attenuating the transient to within acceptable limits.

Typically, protection is provided by a fixed-set point surge relief device. A fixed-set-point surge relief system provides that when the increase in pressure reaches a specific set pressure level, a valve or valves open to relieve the excess pressure and attenuate the transient.

Alternatively, a floating-set-point surge relief system provides that when the time rate of change of pressure exceeds a pre-determined value, a valve or valves open to relive the excess pressure and control the pressure transient. An important feature of the floating-set-point system is that it provides protection from pressure surges even through the steady-state fluid pressure level in the pipeline may change due to varying sets of operating conditions. In such situations, a surge relief system must respond rapidly yet operate very smoothly Such a system should respond to the increasing pressure rise, (i.e., the transient pressure rise), and timely open the pressure relief mechanism. Thereafter, the system should control the rate of pressure rise, (i.e. the transient) to maintain the pressure within acceptable limits. The relieved flow can be dissipated in a large storage vessel and later returned to the product line.

The above-described surge relief systems have drawbacks however. While these systems prevent excess pressure within the pipeline, they do not address the unbalanced pipeline thrust forces or transients that result from the initial pressure surge. And while others address both the excess pressure within a pipeline along with the transients, they unnecessarily discharge fluid from the pipeline in response to transients of brief duration or pressure variations within normal range of pipeline operation, which can affect efficiency and/or become a nuisance.

Accordingly, it is desirable to provide a surge relief method and apparatus that prevents the likelihood of unnecessary discharge of fluid from a pipeline. Moreover, it is desirable to provide a surge relief method and apparatus that prevents likelihood of the discharge of fluid when the pressure variations within the pipeline have a magnitude less than a prescribed value and that ignores any pressure transient unless the positive rate of rise is in excess of a specific value.

SUMMARY OF THE INVENTION

The foregoing needs are met, to a great extent, by the present invention, wherein in one aspect an apparatus is provided that in some embodiments, a surge relief apparatus is provided for sensing and responding to pressure changes in a flow system. The apparatus also includes a control valve that compensates for pressure in response to pressure change in the flow system. The control valve also controls the rate of pipeline pressure rise in the flow system. The surge relief apparatus also includes a hydraulic accumulator in fluid communication with the control valve along with a surge relief valve in fluid communication with the accumulator.

In accordance with one embodiment of the present invention, a surge relief apparatus for use in combination with a surge system is provided, that responds and senses pressure changes in a flow system. The apparatus includes a trigger circuit in which fluid flows. The trigger circuit comprises a bypass valve along with a three-way valve that is in fluid communication with the bypass valve. The trigger circuit also includes an accumulator that is in fluid communication with the bypass valve and the three-way valve. The trigger system functions to prevent the response of the surge system to flow system pressure changes that are of short duration.

In accordance with another aspect of the present invention, a method for responding to pressure changes in a flow system having a flow pressure is provided, comprising the steps of: storing a fluid in a storage tank, wherein the fluid storage tank is in fluid communication with the flow system; controlling the flow fluid from the fluid storage tank via a control valve that is in fluid communication with said fluid storage tank, wherein said control valve compensates for pressure in response to pressure change in the flow system and controls rate of pipeline pressure rise in the flow system; accumulating the fluid in an accumulator that is in fluid communication with the control valve; and relieving the pressure in the flow system via a surge relief valve.

In accordance with yet another aspect of the present invention, a method for responding to pressure variations of short duration in a flow or rates of pressure change in a flow system having a surge system that senses and responds to flow system pressure changes and has a control valve and a surge relief valve, comprising the steps of: storing a fluid in a storage tank, wherein the fluid storage tank is in fluid communication with the flow system; applying the pressure in the flow system to the trigger circuit; and generating a flow through the trigger circuit, wherein the generation of flow bypasses the control valve and flows through the bypass valve.

In accordance with still another embodiment of the present invention, a surge relief apparatus for sensing and responding to pressure changes in a flow system and/or rate of pressure change in a flow system, comprising a hydraulic circuit in which fluid flows is provided. The apparatus includes means for storing fluid, wherein the means for storing fluid is in fluid communication with the flow system. The apparatus also includes a means for controlling fluid flow that is in fluid communication with said means for storing fluid. The means for controlling fluid flow compensates for pressure in response to pressure change in the flow system and controls rate of pipeline pressure rise in the flow system. The surge relief apparatus also has a means for accumulating fluid that is in fluid communication with the means for controlling fluid flow. Finally, the apparatus includes a means for relieving flow system pressure that is in fluid communication with the means for accumulating pressure.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
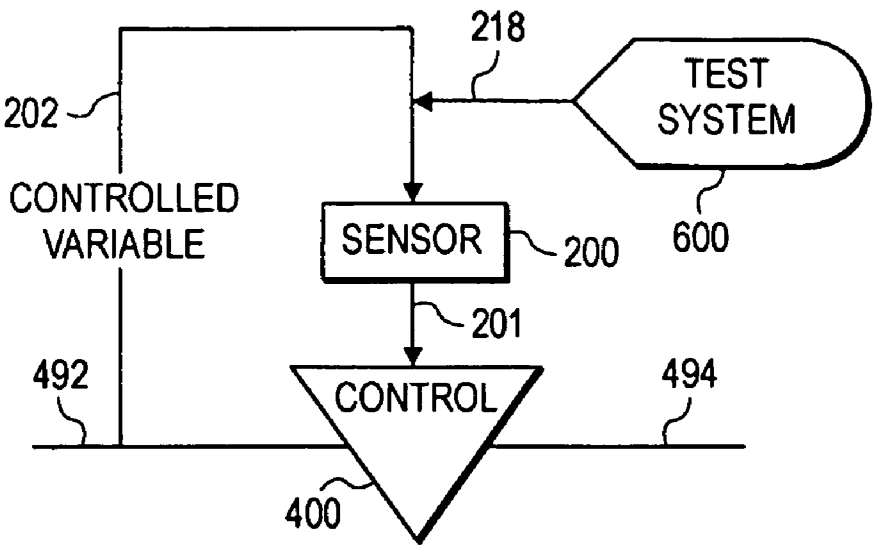
FIG. 1 (PRIOR ART)
FIG. 1 is a flow diagram of an embodiment of the surge relief apparatus encompassed by the present invention.

Various preferred embodiments of the invention provide for a surge relief apparatus and method for controlling liquid pressure and the rate of pressure rise in a liquid transport pipeline or the like. In some arrangements, the apparatus and method are used in combination with an additional hydraulic circuit, while in other arrangements the additional hydraulic circuit may not be utilized. It should be understood, however, that the present invention is not limited in its application to pipelines and/or liquid pipelines, but, for example, can be used with other systems that require the control of pressure and the rate of rise of pressure within the system. Preferred embodiments of the invention will now be further described with reference to the drawing figures, in which like reference numerals refer to like parts throughout.

FIG. 1 is a schematic diagram of an embodiment of the surge relief apparatus encompassed by the present invention. FIG. 1 illustrates a sensor 200 and a control 400 as being the primary elements of the invention. A test system 600 is used to calibrate and test the surge relief apparatus of the present invention. The pressure in the line 492 is sensed by a line 202. The line 202 is accepted by the sensor 200. The sensor 200 is preset to a specific rate of pressure increase. As the controlled variable pressure in the line 202 changes, the sensor 200 provides a signal through a line 201 to the control 400. The control 400 provides that flow is diverted to line 494 according to the requirements of the system to control the rate of pressure increase.

Figure 2:
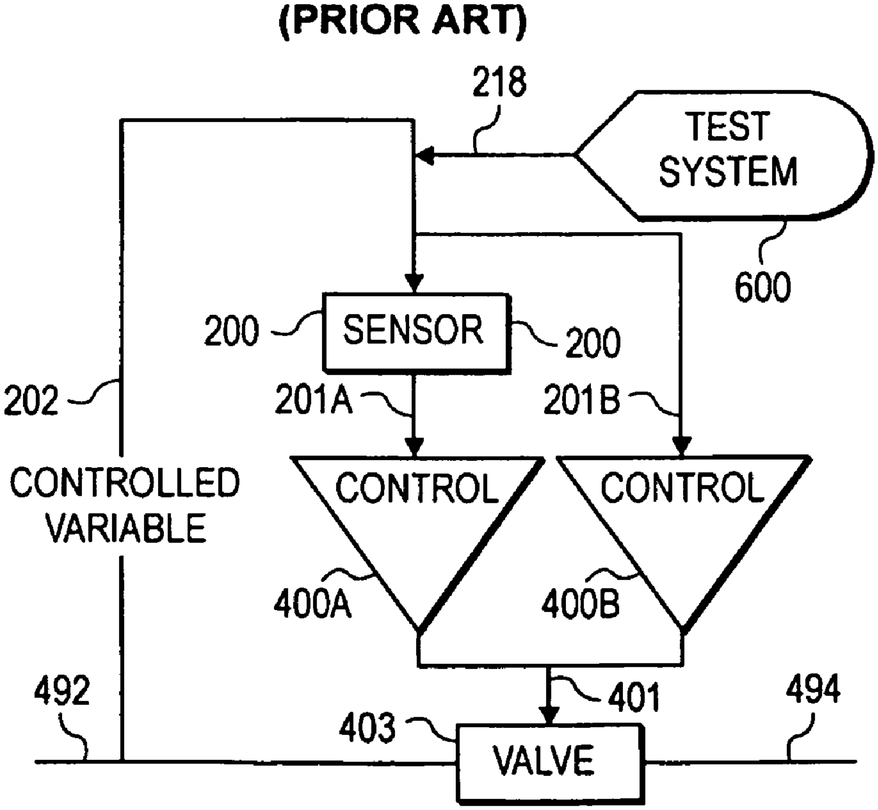
FIG. 2 (PRIOR ART)
FIG. 2 is a flow diagram of another embodiment of the surge relief apparatus encompassed by the present invention.

FIG. 2 is a schematic diagram of another embodiment of the surge relief apparatus of the present invention. The primary components of the surge relief apparatus illustrated in FIG. 2 are a sensor 200, a control 400A, a control 400B and a valve 403. The pressure in a line 492 is transferred to the sensor 200 via a line 202. Also, the pressure in the upstream line 492 is transferred directly to the control 400B via the line 201B. The sensor 200 provides a signal to the control 400A which is responsive to the rate of increase of the pressure in the upstream line 492. A signal from the sensor 200 is provided to the control 400A via the line 201A. The controls 400A, 400B provide a signal to the valve 403 via the line 401. When the rate of rise increases above a predetermined value, the valve 403 is actuated and the rate of pressure increase is controlled by relieving fluid from the system via a downstream line 494. Similarly, when the pressure level in the upstream line 492 exceeds a set value, the control 400B activates the valve 403 to relief pressure through the downstream line 494. Thus, FIG. 2 illustrates a dual control system for relieving pressures exceeding a fixed maximum pressure, and for controlling the rate of pressure increase.

Figure 3:
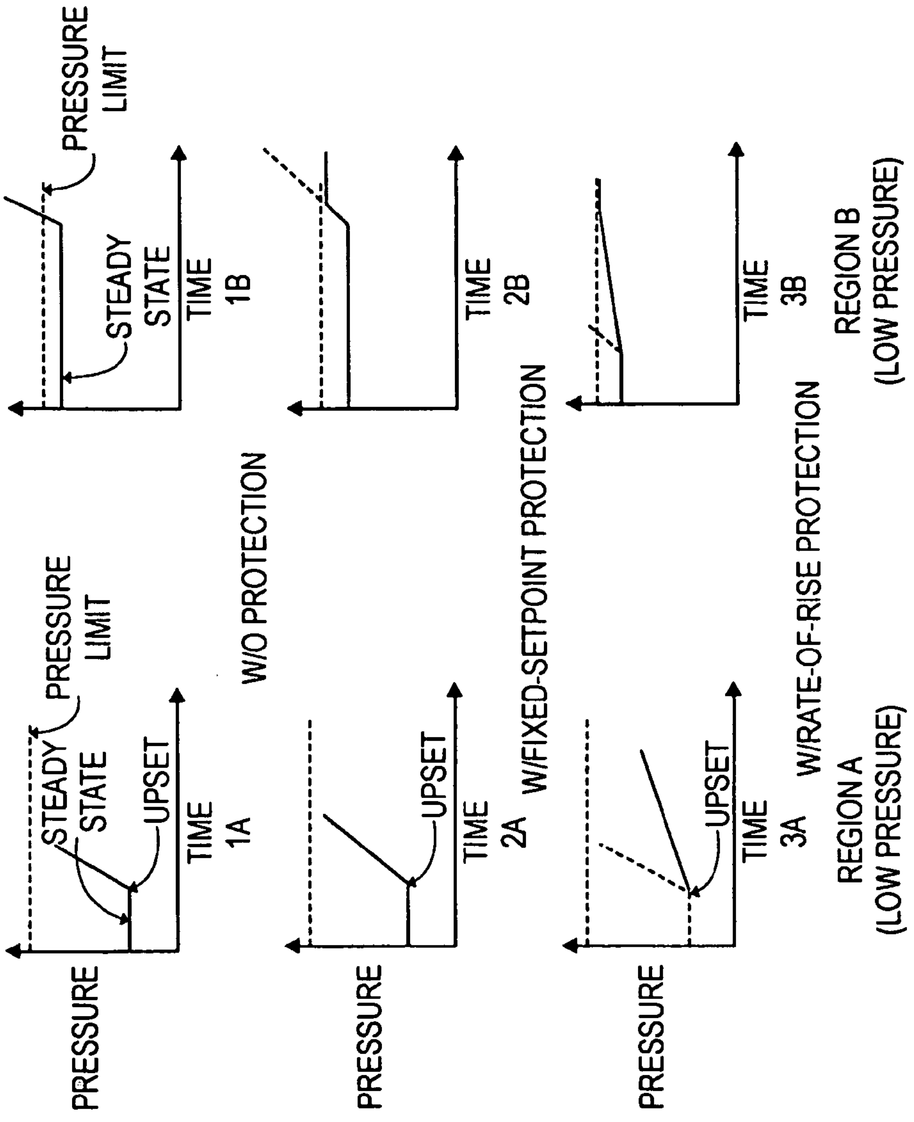
FIG. 3 (PRIOR ART)
FIG. 3 is a graph of pressure versus time for conditions encountered on a pipeline or piping system in which the present invention is to be utilized.

FIG. 3 illustrates two pipeline operating regions, i.e., two different locations on the pipeline: Region A which is low pressure operation and Region B which is high pressure operation. Referring to case 1A, the steady-state pressure is affected by an upset condition which causes the pressure to rise rapidly. This pressure increase is propagated along the pipeline and causes a similar rapid increase in pressure to occur at Region B (case 1B), where due to the high pressure operating condition, the pipeline pressure limit is exceeded. Case 2A illustrates the same upset condition as in case 1A. With fixed set point surge protection added at Region B, case 2B illustrates the pressure being relieved at the pressure limit. Case 3A illustrates the same upset condition, but with rate of rise relief protection located at Region A, the source of the upset condition, which controls the rate of pressure change. This controlled lower rate of pressure rise is now propagated along the pipeline, and is shown at Region 3B to not exceed the pressure limit.

One problem with fixed-set-point surge protection is that there may occur pipeline operation modes in which the normal steady-state operating pressure is not always the same. For instance, at one operating mode, the steady state pressure may be 400 PSIG, while at another operating mode, the steady state pressure may be 600 PSIG. Therefore, the surge relief valves can only normally be set to operate at the maximum allowable operating pressure (MAOP) of the pipeline and are not limited in application to the high pressure operating regions of the pipeline. Thus in the typical situation, fixed-set-point surge protection will only respond if the maximum allowable operating pressure has been exceeded. As the present embodiment can float with the pipeline pressure at any steady-state condition, the unit can be located at or near the source of surge generation to control the rate of pressure change so that excessive rates of pressure change will not propagate along the pipeline, which allows time for various pipeline systems to respond and maintain pipeline operations within acceptable pressure limits. It can be appreciated by one skilled in the art that various embodiment the present invention are adaptable for use over any pressure range.

Figure 4:
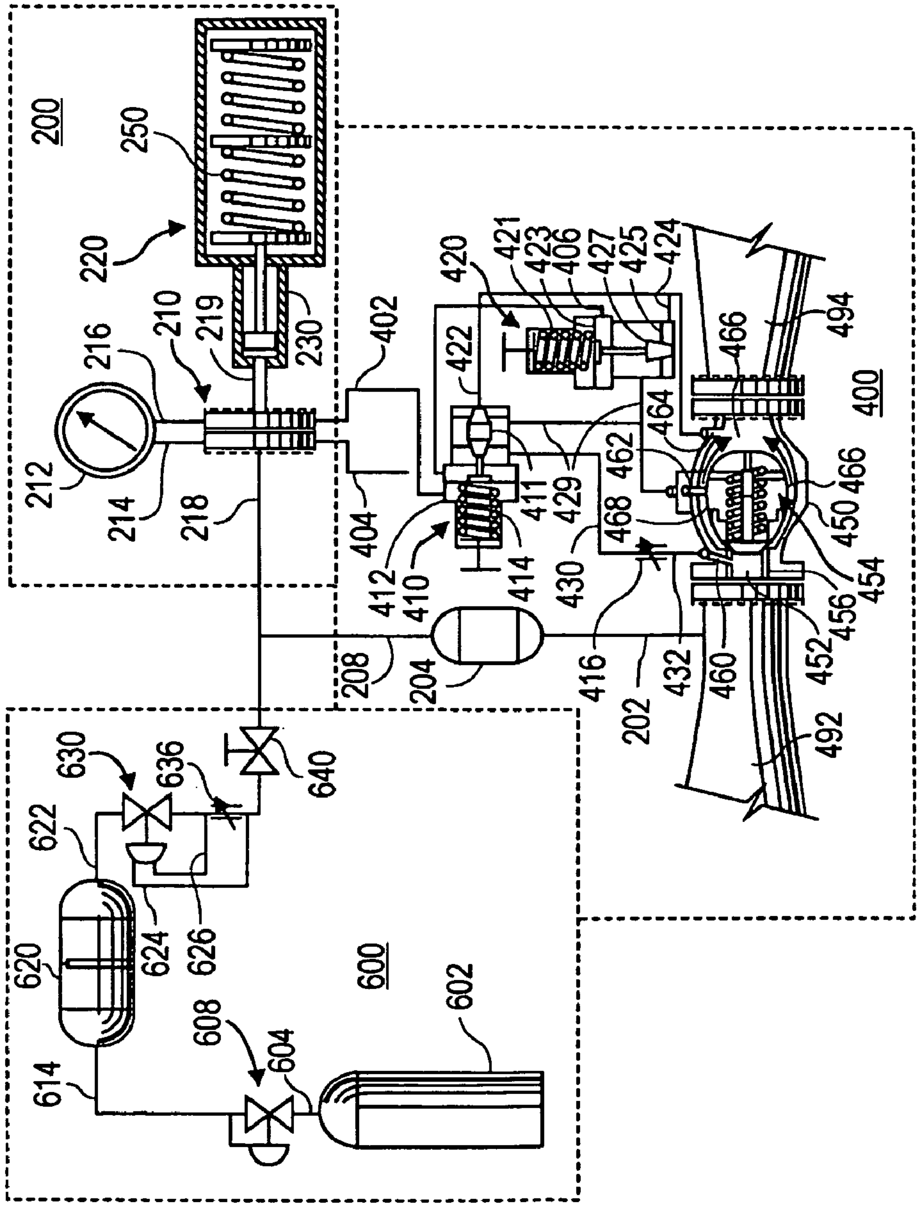
FIG. 4 (PRIOR ART)
FIG. 4 is a schematic view of a preferred embodiment of the surge relief apparatus encompassed by the present invention.

FIG. 4 illustrates the surge relief system 100, including a sensor 200, a control unit 400 and a testing system 600. The sensor 200 and the control unit 400 are the primary components of the surge relief system 100. The fluid enters and fills a conduit 492, upstream of a normally closed valve 450. Opening the valve 450 causes the fluid to exit an outlet conduit 494. Normally fluid would enter and fill the conduit 492, pass through a line 432, through an adjustable speed controller 416, through line 430 and into a differential pilot regulator 410. Thereafter, fluid would fill one or more lines 429 to be received by the valve 450 thereby holding the valve 450 in the closed position with respect to by-pass flow. Also, the fluid pressure would engage an upstream line 202 prior to engaging a measuring element 210. The measuring element 210 can be, for example, an orifice meter. The measuring element 210 is connected to a differential pressure gauge 212 by a first line 214 and a second line 216. A change in the pressure in the line 202 upstream of the measuring element 210 causes a pressure differential which relates to the flow rate between the line 218 on the upstream side, and a line 219, on the downstream side of the measuring element 210. The downstream line 219 associated with the measuring element 210 is operationally associated with a reference element 220. The reference element 220 is a linearizing device. Under steady-state conditions, the pressure level applied to the reference element 200 is closely related to the pressure level in the line 492. In one embodiment, the reference element 220 has a fluid chamber 230 and a spring chamber 250. The pressure on the upstream side of the measuring element 210 is transferred via an upstream line 402 to the differential pilot regulator 410. The downstream pressure is transferred via a line 404 to the differential pilot regulator 410. Another line 406 connects the upstream line 402 to a back pressure pilot regulator 420. The back pressure pilot regulator 420 is operationally associated with several lines 422, 424, 429 and 406. The flow from the differential pilot regulator 410 can pass through the first line 422 and the second line 424 into the downstream port 464 of the valve 450.

The valve 450 is preferably a valve such as the DANFLO® valve available from the Daniel Valve Company, a member of SPX Valves & Controls. The valve 450 has an inlet port 452 and an outlet port 466. The inlet port 452 is associated with a plug 454 which is sealed in the inlet port 452 by a seal 456. Also associated with the inlet port 452 is an upstream port 460. The interior of the valve 450 receives flow through a plug cavity port 462. Also, flow can egress through the outlet port 466 by the downstream port 464. When the plug 454 is displaced, fluid passes from the inlet port 452 through the annular passage 269 and into the outlet port 466.

The testing system comprises a canister of compressed gas 602 from which the gas passes via a line 604. A pressure reducing regulator 608 controls the pressure downstream of the regulator 608. A line 614 passes gas from the pressure reducing regulator 608 to the accumulator 620. The flow from the accumulator 620 is controlled by a differential pressure regulator 630 in conjunction with a metering valve 636. The test system provides a variable rate of pressure change to the sensor 200 via the valve 640 and the line 218.

With respect to the differential pilot regulator 410, a double acting valve 411 is illustrated. The flow coming into the double acting valve 411 via the line 430 is modulated by the signal from the measuring element 210 and the reference element 220. The back pressure pilot 420 has a spring 421, a diaphragm 423, a poppet 427 and a seat 425 associated with the poppet. Obviously, other embodiments of the present invention are readily available to those skilled in the art. The present preferred embodiment is provided as an illustration of one of the embodiments of the present invention.

The separation device 204 is used to separate or seal the secondary fluid from a primary fluid. The separation device 204 can be placed at various locations to provide a separation of different fluids in the system.

Figure 5:
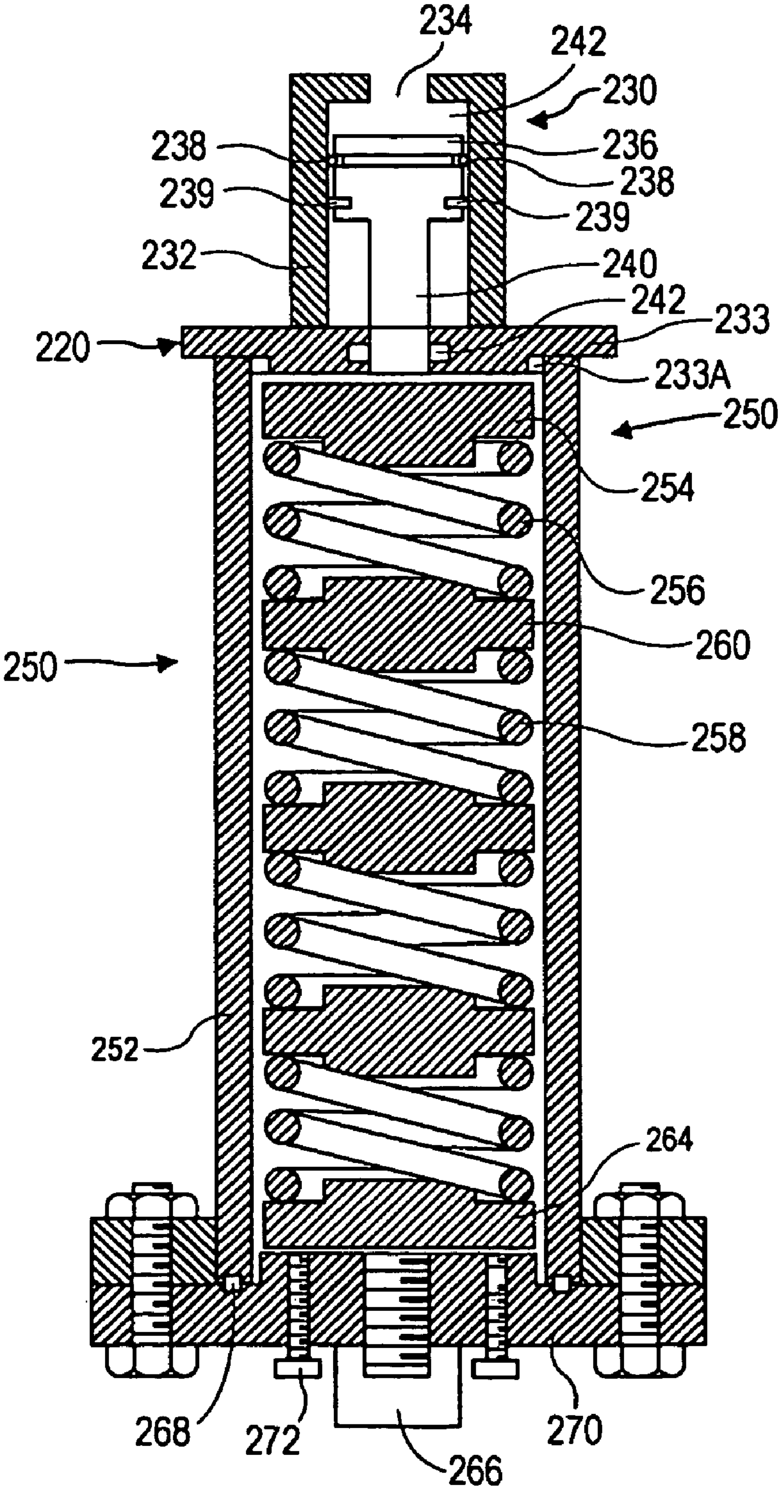
FIG. 5 (PRIOR ART)
FIG. 5 illustrates a cut away view of one embodiment of the reference chamber device of the present invention.

FIG. 5 illustrates a cut away view of one embodiment of the reference element 220. The reference element 220 has the fluid chamber 230 and the spring chamber 250 as its primary components. The fluid chamber 230 has a housing 232 which is engaged with a casing 252 of the spring chamber 250. The housing 232 has an orifice 234 which is operationally engaged with the line 219 (See, FIG. 4). The housing 232 has a piston 236. The piston 236 has a seal 238 and a guide ring 239. Engaged with the piston 236 is a rod 240. The fluid chamber 230 of the reference element 220 has a lower endcap 233 in operative association with an o-ring 233A for sealing the endcap 233. The fluid chamber 230 has an upper endcap 237 in operative association with an o-ring 237A for sealing the endcap. The rod 240 is movably engaged with a bearing 242. As the piston 236 moves in the housing 232, a fluid chamber 235 is created. Thus, as the fluid ingresses through the orifice 234, the size of the fluid chamber 235 is increased as the piston 236 pushes the rod 240. The spring chamber 250 is provided with an adjustment plug 266 for precise setting of pre-load on the springs, thereby controlling the threshold at which the system detects a transient.

In this illustrated embodiment, the spring chamber 250 has a casing 252 which contains a contact piston 254, an intermediate piston 260 and a lower guide piston 264. Between the respective pistons 254, 260 and 264 are the nested springs 256 and 258. It can be appreciated that the number of intermediate pistons 260 and the respective springs 256 and 258 can be increased in number as needed. The pistons 254, 260 and 264 have associated therewith, on the sides engaging the springs 256 and 258, a projection 261.

Figure 6:
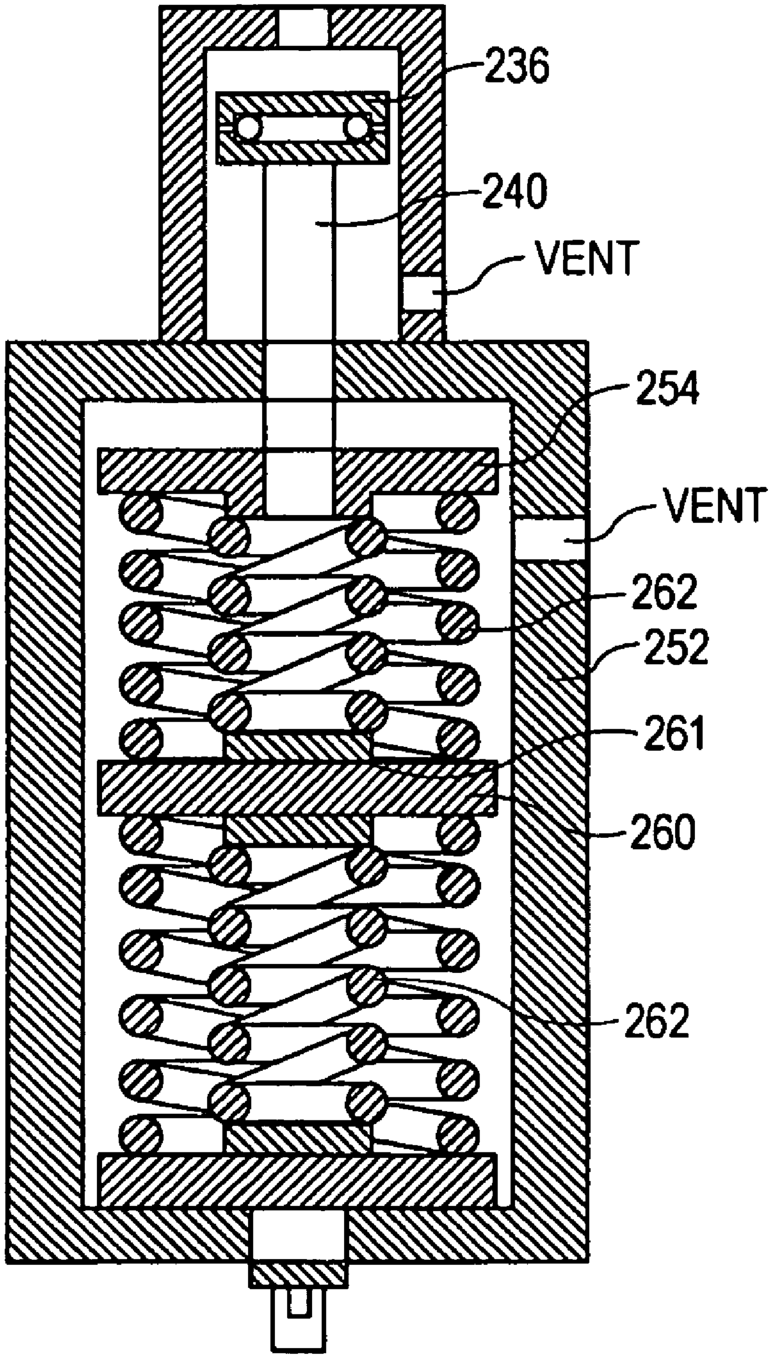
FIG. 6 (PRIOR ART)
FIG. 6 is a cut away view of another preferred embodiment of the reference chamber device of the present invention.

FIG. 6 illustrates one embodiment of the reference element 250. The spring chamber 250 includes additional pistons 260, the springs 262 and the projections 261 associated with the pistons 260. The springs 262 are actively engaged with the pistons 260 such that the end of the spring is engaged with the flat surface. Also illustrated in FIG. 6 is a seal 268 for removably securing the casing 252 to a cap flange 270. The cap flange 270 has a drain plug 272 and an adjustment plus assembly 266. The spring housing may also contain a fluid.

In another embodiment, the springs 262 have a flattened end 262A. The flattened end 262A of the springs 262 engage the contact piston 254, the intermediate pistons 260 and the lower guide piston 264. The method of securing the flat portion of the springs to the pistons provides for reducing hysteresis.

Figure 7:
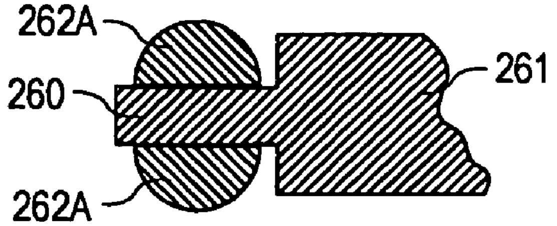
FIG. 7 (PRIOR ART)
FIG. 7 is a cross sectional, exploded view of the spring biased reference chamber piston of the present invention illustrating the end of the spring as it engages the pistons adjacent to the projection.

FIG. 7 is a cross sectional, exploded view of the end 262A of the spring 262 as it engages the pistons 260 adjacent to the projection 261. The movement of the flattened spring surfaces contacting the pistons 260 may be controlled by appropriate surface finish of the piston 260 or other means of securing such as welding, clamping or pinning, thereby reducing friction and subsequently a reduction in hystersis.

Figure 8:
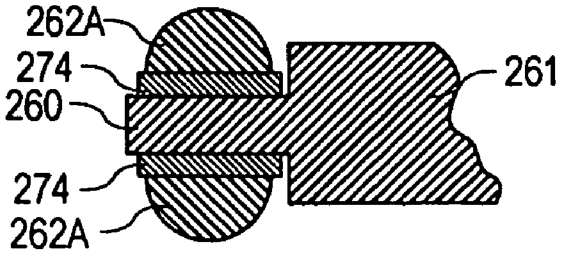
FIG. 8 (PRIOR ART)
FIG. 8 illustrates yet another embodiment of the spring biased reference chamber piston of the present invention.

FIG. 8 is yet another embodiment of the end of the spring 262. The end 262A of each spring 262 is engaged with a shim 274 rather than the piston 260. The shim 274 abuts between the piston 260 and the projection 261 such that the opposite ends 262A of each spring 262 compresses the shims 274 against the piston 260. Again, the shims may be used to control friction.

Figure 9:
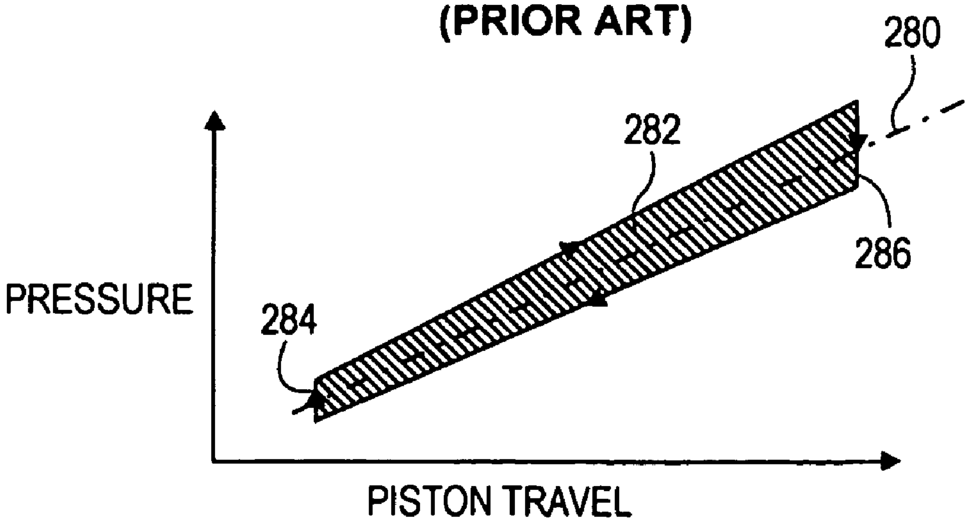
FIG. 9 (PRIOR ART)
FIG. 9 is a graph illustrating the phenomena of hysteresis, or the time lag exhibited by the piston (displacer) as it moves against the spring in reaction to the fluid pressure applied to the piston.

FIG. 9 is a graph illustrating the phenomena of the hysteresis. The objective of eliminating hysteresis is to create as small an area as possible in the enclosed surface or area 282 which has been cross-hatched for clarity. It is an object of the present invention for the compression and expansion of the springs 262 in the spring chamber 250 to create as nearly as practical a continuous, linear straight line 280 in FIG. 9. Thus, if completely accurate, a single straight line as illustrated in FIG. 9 by a dash line 280 would represent no hysteresis. The configuration of the reference element 220 illustrated in FIGS. 5-8 provides for a small area 282. Maintaining a small hysteresis is critical to accurately measuring flow.

Figure 10:
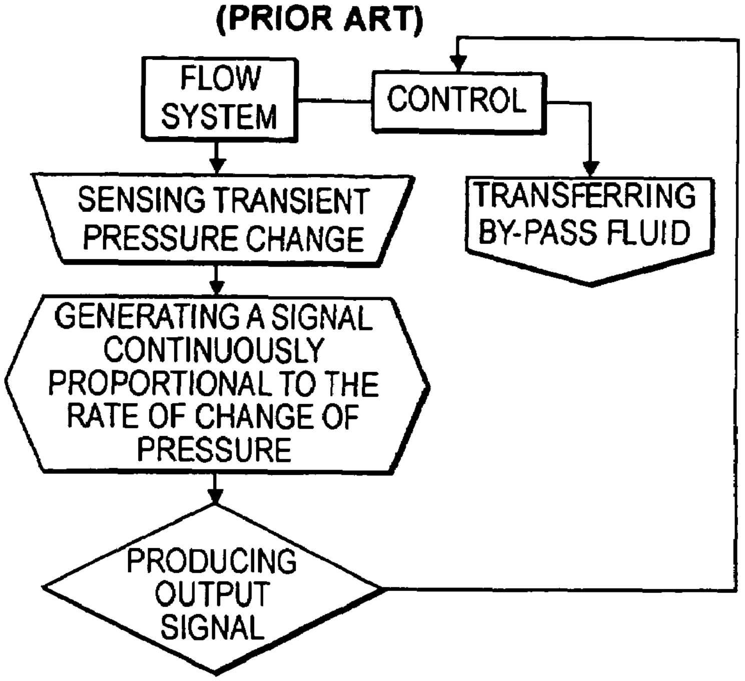
FIG. 10 (PRIOR ART)
FIG. 10 is a flow diagram illustrating a preferred method of the present invention.

FIG. 10 is a schematic diagram illustrating a preferred method using the present invention. The surge relief method of the present invention senses, tracks and responds to pressure changes in the flow system. The surge relief method of the present invention comprises sensing a transient pressure change from the flow system. The pressure change sensed from the flow system is used for generating a signal which is continuously proportional to the rate of change of the pressure as sensed from the flow system. The signal is used for producing an output. The output is used, in association with a control, for discharging fluid from the pipeline to the storage vessel when the rate of change of pressure exceeds a specific amount.

Figure 11:
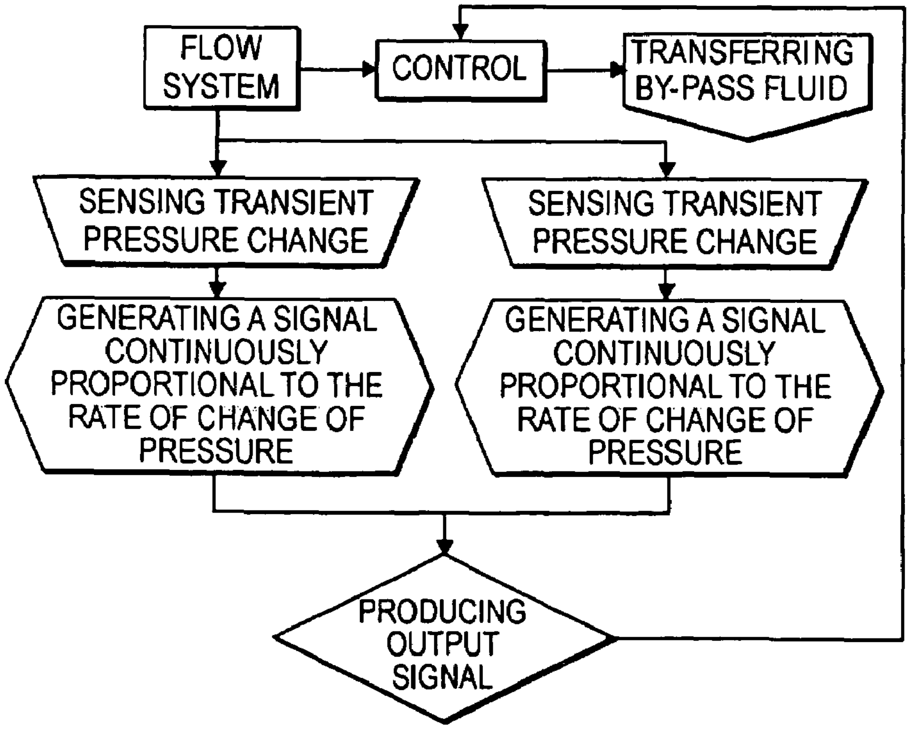
FIG. 11 (PRIOR ART)
FIG. 11 is a flow diagram illustrating another preferred method of the present invention.

FIG. 11 is a schematic diagram illustrating another preferred method of the present invention. FIG. 11 illustrates the use of the present invention to sense the pressure change associated with the flow system and to sense the absolute pressure associated with the flow system. The method of FIG. 11 incorporate sensing transient pressure change and sensing absolute pressure change. The sensing of the transient pressure change provides for generating a signal continuously proportional to the rate of change of the pressure. The sensing of the absolute pressure provides for comparing the absolute pressure to some predetermined pressure which is a characteristic of the flow system. The signals associated with the sensing steps provide for producing an output signal. The output signal in conjunction with controls associated with the flow system, provide for transferring by-pass fluid from the flow system whenever the absolute pressure exceeds a predetermined pressure thereby preventing damage caused by the pressure changes in the flow system.

Figure 12:
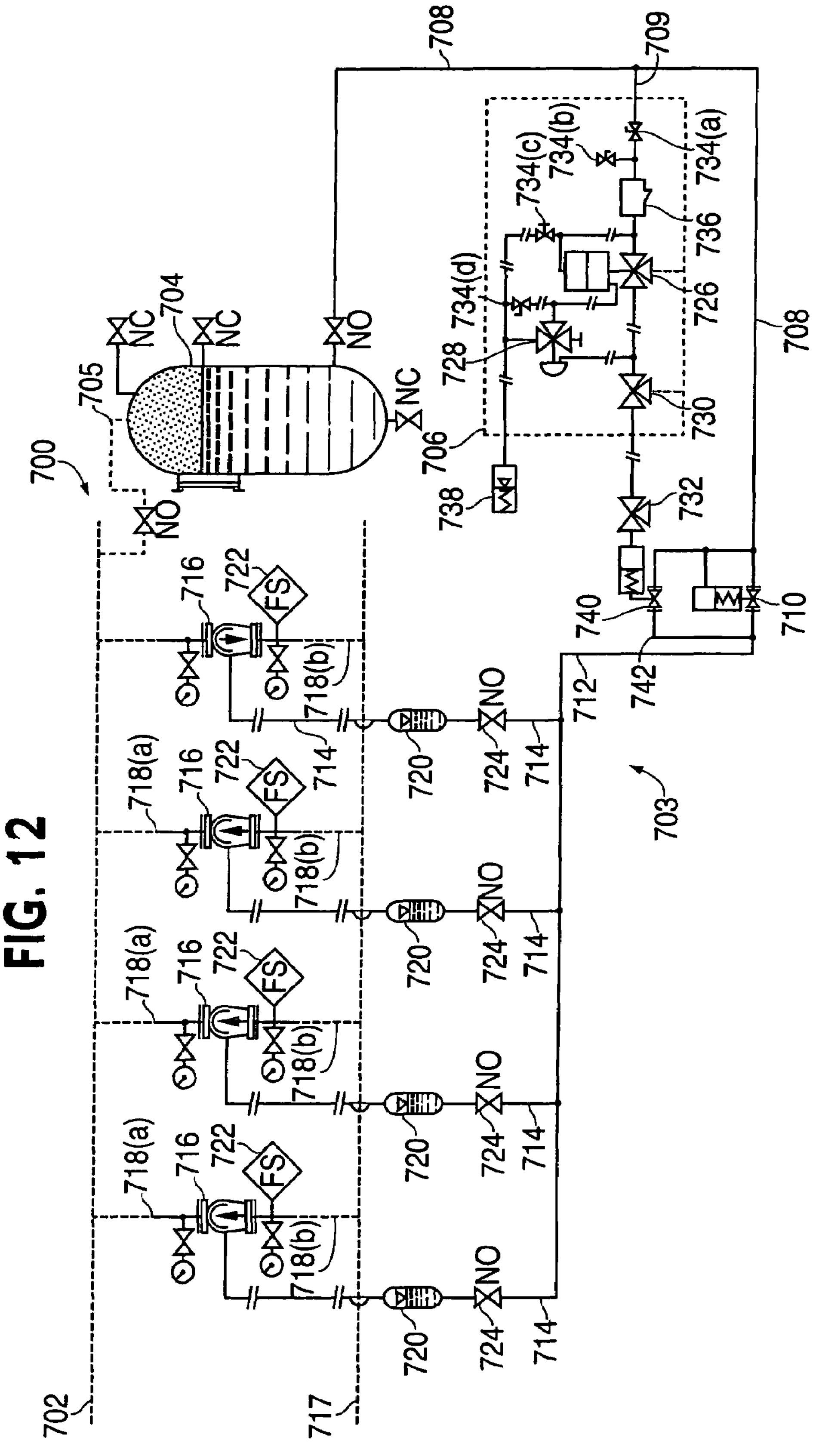
FIG. 12 depicts a flow schematic of a surge relief apparatus in accordance with an alternative embodiment in present invention.

Referring now to FIG. 12, a flow diagram for a surge relief apparatus, generally designated 700, in accordance with an embodiment of the present invention is depicted. The apparatus 700 is illustrated connected to fluid transport pipeline 702 through a conduit 705. The surge relief apparatus 700 is a surge system circuit 703 that includes a fluid storage tank 704 that is in fluid communication with the pipeline 702 via a conduit 705. The fluid storage tank 704 is connected to, and in fluid communication with, a second hydraulic circuit or trigger circuit 706, via conduit 708 in combination with conduit 709. The fluid storage tank 704 is also connected to a pressure compensating valve 710 via conduit 708, wherein the conduit 708 provides an inlet for fluid flow into the pressure compensating valve 710.

The surge relief apparatus 700 additionally includes a conduit 712 that extends from the outlet of the pressure compensating valve 710 and connects with a series of additional conduits, generally designated 714, each connected to a surge relief valve 716. The surge relief valves 716 are each connected to the fluid transport pipeline 702 and a pipeline 717 which lends to a reservoir (not pictured), via conduits 718. In the embodiment depicted, the conduits 718 (a) function for flow into the surge relief valves 716 from the fluid transport pipeline while the conduits 718 (b) function to carry flow out of the surge relief valves 716 and into the reservoir pipeline 717. As depicted in FIG. 12, the conduits 714 also each include a receptacle 720 that is preferably a pneumatic accumulator, positioned along the path of the conduit 714 prior to the conduit 714 connecting with the surge relief valve 716.

As illustrated in FIG. 12, the surge relief apparatus 700 may include various flow switches 722 and flow valves 724 positioned along the path of the surge system circuit 703 of the of the apparatus 700. The flow switches 722 are preferably positioned between surge relief valves 716 and the reservoir pipeline 717 along conduits 718(*b*). Alternative embodiments may include more or less switches 722 positioned at varying locations along the circuit 705 as desired and/or as needed. Also, as illustrated in FIG. 12, the surge system circuit 703 includes various flow control valves 724 positioned, for example, between the conduit 712 and the pneumatic accumulators 720 along the conduits 714 and on conduit 708, adjacent the fluid storage tank 704. Alternative embodiments may include additional flow control valves 724 or less flow control valves 724 and the valves may placed in positions in addition to, or alternative to, those positions indicated on FIG. 12.

Figure 13:
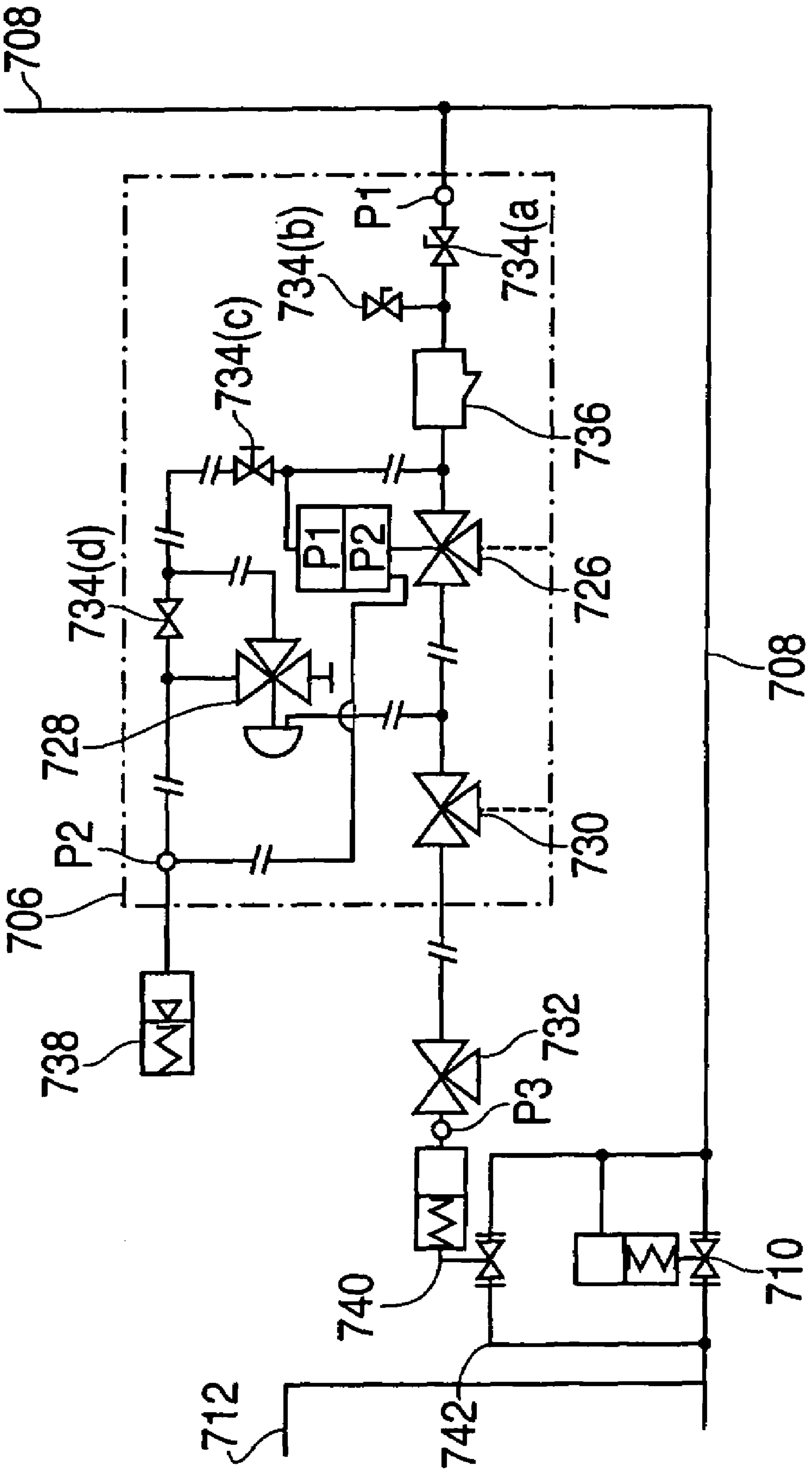
FIG. 13 is a detailed schematic diagram of a trigger flow circuit employed in the surge relief apparatus depicted in FIG. 12.

Referring now to FIG. 13, the trigger circuit, generally designated 706, is depicted. The trigger circuit 706 is connected to, and in fluid communication with, the surge system circuit 703 of the surge relief apparatus 700 via conduit 709. As illustrated in FIG. 13, the trigger circuit 706 includes a series of differential pilot operated three-way valves 726, 728, 730, 732 along with a plurality of manual-operated flow valves, each generally designated 734. The trigger circuit 706 also includes a fluid filter 736 and a spring loaded accumulator 738. The trigger circuit 706 further includes bypass valve 740 and a bypass conduit assembly 742.

Referring now to both FIGS. 12 and 13, of the surge relief apparatus 700 during its operation, functions to control both the pressure within the pipeline 702 and the rate of pressure rise within the pipeline 702 by discharging fluid from the pipeline 702 to a storage tank.

During operation, the surge system circuit 703 of the surge relief apparatus 700 is charged with a fluid, preferably glycol, and the circuit 703 is connected to the pipeline 702 via the conduit 705. During normal and/or steady state operating conditions, the pressure in the pipeline 702 is equal to the pressure in the fluid storage tank 704 and therefore within the circuit 703. During these conditions, the pressures are equal at all points within the surge assembly circuit 703, therefore the gas pressure within the accumulators 720 is equal to the glycol pressure, thus glycol flow is not generated during steady state operating conditions.

Alternatively, when pipeline pressure begins to increase to and beyond a preset level, the glycol pressure becomes greater than gas pressure within the accumulators 720. This pressure differential causes the flow of glycol through the surge system circuit 703. As the glycol flows through the circuit 703 and through the pressure compensating valve 710, a pressure drop occurs across the valve 710 and a differential pressure is created across the pressure compensating valve 710. This differential pressure is transferred to the accumulators via conduits 712 and 714 providing addition fluid to the accumulators 720 while reducing the gas volume contained therein. This occurrence at the accumulators 720 generates a bias pressure which in turn opens the relief valves 716, allowing liquid to exit the pipeline 702 through conduits 718(*b*) and enter a storage tank via conduit 717.

As the rate of pressure in the pipeline 702 continues to increase, the greater pressure differential is between the glycol storage chamber 704 and the accumulators 720. As a result of the greater pressure difference, a greater opening bias pressure is applied to the relief valves 716, causing the relief valves 716 to adjust to a greater opening position, thereby allowing more flow to be discharged through the valves 716 and into the storage tank.

As fluid or glycol flows through the pressure compensating valve 710, it performs two separate and distinctly different functions. First, the valve 710 compensates for increased pressure within the pipeline 702. Increasing pressure within the pipeline 702 causes the gas in the accumulators 720 to become compressed, however the volume change of the within the accumulators 720 is not a linear function relative to the pipeline 702 pressure. Therefore, the pressure compensating valve 710 must produce consistent results independent of the pipeline pressure 702. Second, the valve 710 functions to adjust to or respond to transients or pipeline pressure surges, or rate of pressure rise, to produce a pressure differential that approaches the assigned rate of pipeline pressure rise.

The pressure compensating valve 710 performs the two above-described functions by employing an elongated valve plug in combination with an actuator. The plug is characterized so it travels only the appropriate length within the valve body for the desired rate of rise. This characterization is accomplished through the mechanical connection or link between the actuator and the valve plug which can be adjusted in terms of length, providing the pressure compensating valve 710 with a flow capacity control mechanism of great length, while comparatively, the actuator produces a rather small movement. This adjustment of the mechanical link allows for the appropriate section of the plug to be active in the orifice of the pressure compensating valve 710.

The aforementioned combination allows the valve 710 to adjust the flow capacity of the pressure compensating valve 710 by enabling the flow orifice of the valve 710 to increase and decrease in size in response to fluid flow through the valve 710. For example, as flow increases through the pressure compensating valve 710, the plug position is adjusted so that the orifice decreases in size. To the contrary, as flow decreases through the pressure compensating valve, the plug position is adjusted so that the orifice increases in size.

Therefore, as a result of the aforementioned characteristics of the pressure compensating valve 710, the valve 710 can be utilized to provide pressure compensation as well as control for specific rates of pipeline pressure rise.

Continuing to refer to both FIGS. 12 and 13, during operation of the surge relief apparatus 700, the trigger circuit 706 functions as a bypass fluid flow circuit that bypasses the pressure compensating valve 710. The trigger circuit 706 functions to prevent the likelihood of the surge system circuit 703 from discharging fluid into the reservoir in response to pressure variation of a short duration and/or rates of pipeline pressure rise lower than a specified magnitude. This action is partly due to the bypass valve 740 having a larger flow capacity than the pressure compensating valve 710. Therefore, when a pressure surge or transient occurs at a value less than the value preset at the bypass valve 740, flow is directed through the bypass valve 740 and not through the pressure compensating valve 710. Thus, a pressure differential does not occur at the pressure compensating valve 710 and thus, activation of the surge relief valves 716 does not occur. The aforementioned operation of the trigger circuit 706 will be described in further detail below.

The bypass valve 740 remains open until the trigger circuit 706 is activated or glycol begins to flow through the circuit 706 due to pressure differential. When uniform pressure exists within the apparatus 700, including the surge system circuit 703 and trigger circuit 706, a differential pressure does not exist across the orifice of the pressure compensating valve 710 of the bypass valve 740 and the surge relief valves are not activated.

During operation of the trigger circuit 706, the pipeline 703 pressure is applied to the trigger circuit at point $P_1$, via the glycol storage tank 704 and conduits 708 and 709, similar the application of pressure to the surge system circuit 703 previously described. The pressure, or glycol fluid migrates through the trigger circuit 706, causing the differential pilot operated three-way valve 728 to open, allowing the pressure at points $P_1$ and $P_2$ to equalize, and thereby glycol flow bypasses the manually operated flow valve 734(*d*). The pressure also migrates through the differential pilot operated three-way valve 726 which is normally open and on to the differential pilot operated three-way valves 730 and 732. This aforementioned migration opens the bypass valve 740. This condition is considered the steady state condition or normal operating condition mentioned above wherein uniform pressure exists in apparatus 700.

Now, if uniform pressure no longer exists within the apparatus 700 and a pressure rise of significant magnitude occurs at $P_1$, a pressure drop across the manual flow valve 734(*c*) is produced. This pressure drop results from glycol flow through the manual flow valve 734(*c*) and the differential pilot operated three-way valve 728 and into the accumulator 738. When the pressure difference between $P_1$ and $P_2$ reaches approximately 15 pounds per square inch (psi), the differential pilot operated three-way valve 726 vents some of the pressure from the differential pilot operated three-way valves 728 and 730.

Next, the differential pilot operated three-way valve 728 closes, forcing glycol flow from point $P_1$ to point $P_2$ and through differential pilot operated three-way valve 732 and into the accumulator 738. The differential pilot valve 730 then vents differential pilot valve 732, which in turn vents the actuator of the bypass valve 740. This aforementioned ventilation of the actuator of the bypass valve 740 cause the valve 740 to close.

By the bypass valve 740 closing, the pressure compensating valve 710 is no longer being bypassed and therefore it is activated. When the pressure compensating valve 710 is activated, glycol flows through its orifice as previously described, allowing the pipeline pressure to be controlled by the surge relief valves 716. Once the pressure at $P_1$ stops increasing, $P_1$ and $P_2$ become equal once again due to the flow of glycol through manual flow valve 734(*d*).

As glycol fluid begins to flow through the flow valve 734(*d*), the pressures equalize ($P_1$ equals $P_2$) and the trigger circuit 706 begins to return to the steady state. The differential between $P_1$ and $P_2$ drops below 15 psi and causes differential pilot valve 726 to open, which causes differential pilot valve 728 to be pressurized, opening the bypass valve 740. The trigger circuit 706 is now returned to the steady state condition described above.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A surge relief apparatus for sensing and responding to pressure changes in a flow system and/or rate of pressure change in a flow system, comprising a hydraulic circuit in which fluid flows, wherein said hydraulic circuit comprises:

a control valve that is in fluid communication with the flow system, wherein said control valve compensates for pressure in response to pressure change in the flow system and controls rate of pipeline pressure rise in the flow system;

a first hydraulic circuit accumulator in fluid communication with said control valve;

a first surge relief valve in fluid communication with said first hydraulic circuit accumulator;

a second hydraulic circuit accumulator in fluid communication to with said control valve;

a third hydraulic circuit accumulator in fluid communication to with said control valve;

a fourth hydraulic circuit accumulator in fluid communication to with said control valve;

a second surge relief valve in fluid communication with said second hydraulic circuit accumulator;

a third surge relief valve in fluid communication with said third hydraulic circuit accumulator; and a fourth surge relief valve in fluid communication with said fourth hydraulic circuit accumulator.

2. A surge relief apparatus for sensing and responding to pressure changes in a flow system and/or rate of pressure change in a flow system, comprising a hydraulic circuit in which fluid flows, wherein said hydraulic circuit comprises:

a control valve that is in fluid communication with the flow system, wherein said control valve compensates for pressure in response to pressure change in the flow system and controls rate of pipeline pressure rise in the flow system;

a first hydraulic circuit accumulator in fluid communication with said control valve;

a first surge relief valve in fluid communication with said first hydraulic circuit accumulator; and a trigger circuit in fluid communication with said hydraulic circuit, wherein said trigger circuit comprises:

a bypass valve that causes fluid flow to bypass said control valve;

a first three-way valve in fluid communication with said bypass valve;

a trigger circuit accumulator in fluid communication with said bypass valve and said first three-way valve;

a second three-way valve in fluid communication with said bypass valve;

a third three-way valve in fluid communication with said bypass valve; and a fluid filter that filters the fluid as it flows through the trigger circuit.

3. The surge relief apparatus according to claim 2, further comprising a plurality of manual flow control valves disposed along said hydraulic circuit and along said trigger circuit.

4. The surge relief apparatus according to claim 2, wherein the fluid that flows through said hydraulic circuit and said trigger circuit is glycol fluid.

5. The surge relief apparatus according to claim 2, further comprising a bypass conduit assembly, wherein said bypass conduit assembly and said bypass valve provide a flow path for the fluid flow that bypasses said control valve.

6. The surge relief apparatus according to claim 2, wherein said trigger circuit prevents the response of the surge system to flow system pressure changes that are of short duration.

7. The surge apparatus according to claim 2, wherein said trigger circuit prevents the response of the surge system to flow system rates of pressure change that are lower than a specified magnitude.

8. A surge relief apparatus for use in combination with a surge system that senses and responds to pressure changes in a flow system and rates of pressure change in a flow system, comprising a trigger circuit in which fluid flows, wherein said trigger circuit comprises:

a bypass valve;

a first three-way valve in fluid communication with said bypass valve; and a trigger circuit accumulator in fluid communication with said bypass valve and said first three-way valve;

a second three-way valve in fluid communication with said bypass valve;

a third three-way valve in fluid communication with said bypass valve; and a fluid filter that filters the fluid as it flows through the trigger circuit, wherein said trigger circuit prevents the response of the surge system to flow system pressure changes that are of short duration.

9. The surge relief apparatus according to claim 8, further comprising a hydraulic circuit in which the fluid flows, wherein said hydraulic circuit comprises:

a fluid storage tank that is in fluid communication with the flow system;

a control valve that is in fluid communication with said fluid storage tank, wherein said control valve compensates for pressure in response to pressure change in the flow system and controls rate of pipeline pressure rise in the flow system;

a first hydraulic circuit accumulator in fluid communication with said control valve; and a first surge relief valve in fluid communication with said first hydraulic circuit accumulator.

10. The surge relief apparatus according to claim 9, further comprising:

a second hydraulic circuit accumulator in fluid communication to with said control valve;

a third hydraulic circuit accumulator in fluid communication to with said control valve;

a fourth hydraulic circuit accumulator in fluid communication to with said control valve;

a second surge relief valve in fluid communication with said second hydraulic circuit accumulator;

a third surge relief valve in fluid communication with said third hydraulic circuit accumulator; and a fourth surge relief valve in fluid communication with said fourth hydraulic circuit accumulator.

11. The surge relief apparatus according to claim 9, further comprising a bypass conduit assembly, wherein said bypass conduit assembly and said bypass valve provide a flow path for the fluid flow that bypasses said control valve.

12. The surge apparatus according to claim 8, wherein said trigger circuit prevents the response of the surge system to flow system rates of pressure change that are lower than a specified magnitude.

13. A method for responding to pressure variations of short duration in a flow or rates of pressure change in a flow system having a surge system that senses and responds to flow system pressure changes and has a control valve and a surge relief valve, comprising:

applying the pressure in the flow system to a trigger circuit; and generating a flow through the trigger circuit, wherein the generation of flow bypasses the control valve and flows through a bypass valve, wherein the step of generating flow through the trigger circuit closes the bypass valve, directing flow through the control valve.

14. The method for responding to pressure variations according to claim 13, further comprising the step of storing a fluid in a storage tank, wherein the fluid storage tank is in fluid communication with the flow system.

15. The method according to claim 13, further comprising:

producing a pressure loss at the control valve, wherein the pressure loss generates a biasing pressure at the surge relief valve; and opening the surge relief valve in response to the biasing pressure.

* * * * *